Figure 6:
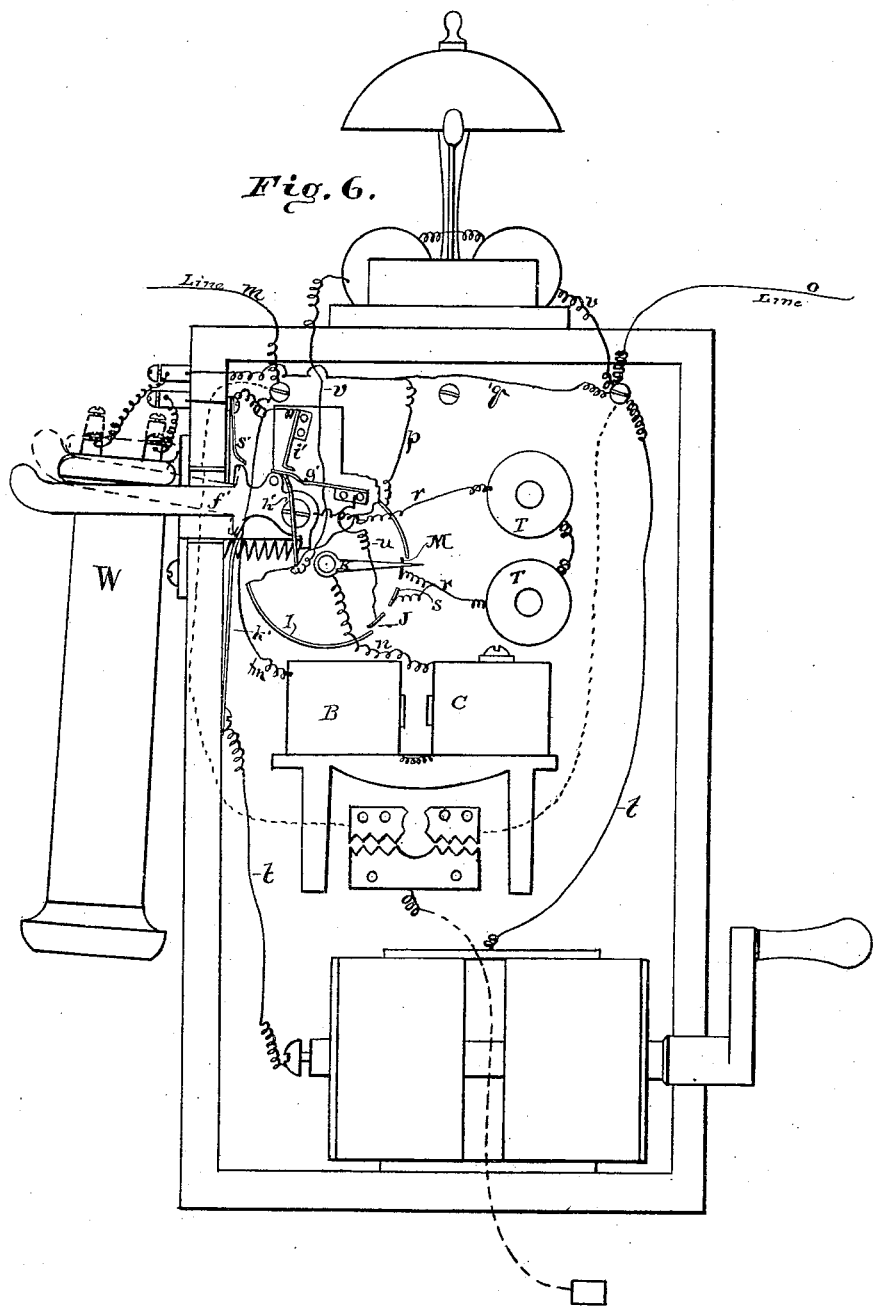

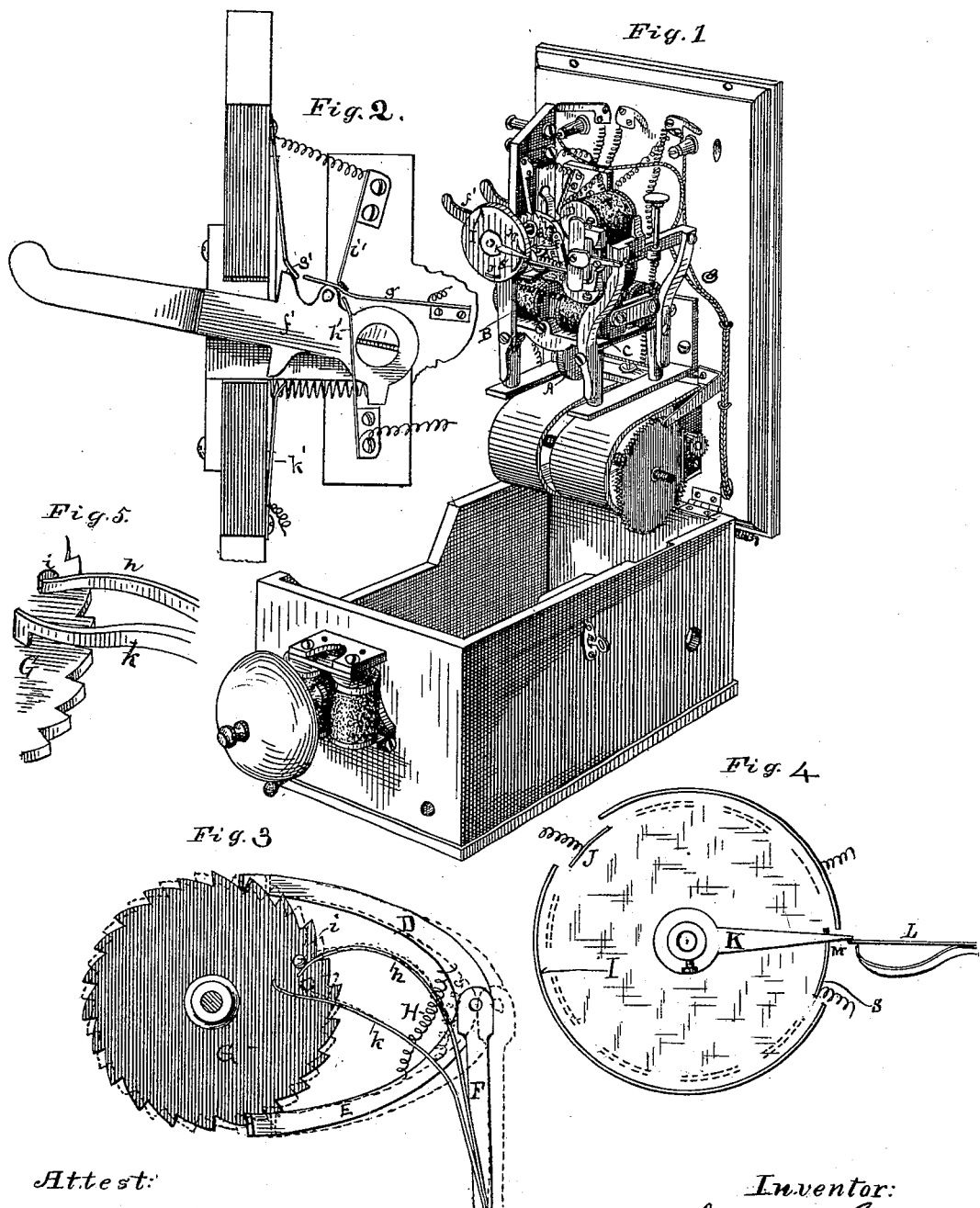

(No Model.) 2 Sheets—Sheet 2.

J. P. STABLER.
TELEPHONE LOCAL CALL INSTRUMENT.

No. 265,454. Patented Oct. 3, 1882.

ATTEST:
J. C. Turner
Aug. Jordan

INVENTOR:
James P. Stabler
By his Atty R. D. O. Smith

UNITED STATES PATENT OFFICE.

JAMES P. STABLER, OF SANDY SPRING, MARYLAND.

TELEPHONE LOCAL CALL-INSTRUMENT.

SPECIFICATION forming part of Letters Patent No. 265,454, dated October 3, 1882.

Application filed May 4, 1882. (No model.)

*To all whom it may concern:*

Be it known that I, JAMES P. STABLER, of Sandy Spring, in the county of Montgomery and State of Maryland, have invented a new and useful Improvement in the Local Call-Instrument for Telephone-Lines shown and described in my Patent No. 235,058, granted to me November 30, 1880; and I do hereby declare that the following is a full and accurate description of the same.

The instrument shown and described in my Patent No. 235,058, November 30, 1880, is provided with a pole-changing key, two electro-magnets of opposite polarity, a vibrating polarized armature, and a pawl and ratchet actuated thereby, whereby a revolving index-switch in the electric line is rotated to a position corresponding with the station-shunt, whereby the current is shunted to the bell or to the detent-magnets. Said pole-changing key is operated solely by the attendant, and therefore the index can be moved only so fast as said key can be operated. In the use of said pole-changing key the operator is required to determine the time to arrest the index by counting or observing its position, and diverted attention may result in a miscount and a necessary repetition of the operation. In that instrument the index is moved one station by one forward and one backward movement of the vibrating armature, produced by one current in each direction from the generator.

The object of another invention of mine, for which I made application for Letters Patent January 24, 1882, is to substitute an automatic pole-changer for the manual one above mentioned and a positive station-stop for a stop depending upon the momentary observation of the operator, so that the manual duty of the operator is limited to the depression of the proper station-key and holding it down until the index is automatically brought around to the proper point and automatically arrested. By this means the instrument is operated in less time and with less margin for inaccuracy.

I propose to use a station-instrument the same as or similar to that described in my patent above mentioned, and to actuate the index of said station-instrument by a ratchet-and-pawl movement similar to or like that described in said patent, but provided, as herein described, with an escapement-stop. I also propose to change the relation of shunt length to the length of the index movement. It will therefore be unnecessary to describe herein the structure of any parts of the said instrument excepting those pertaining to the ratchet and pawl and its escapement-stop and the shunts.

In addition to the advantages as to time and accuracy set forth above, the present invention makes it entirely practicable to substitute the ordinary magneto-generator for the troublesome and expensive voltaic battery used by many telephone-exchanges, and at the same time retain all the advantages of an individual call, and eliminate the great objection to the exclusively magneto system for combination lines—viz., the absence of a definite indication by which the subscribers may know whether the line is in use or not.

My invention therefore consists, first, in a station-shunt of such length in relation to the movements of the index as to require the index to make at least two pauses on the shunt; second, in a revolving ratchet and a reciprocating push-and-pull pawl, whereby said ratchet is caused to rotate, and an escapement-stop whereby said ratchet is retained from forward motion by reason of its momentum after the movement of the pawl has ceased; third, in a unison shunt or shunts of such length that the index may be moved from the unison-detent or normal unison-point to indicate that the line is in use without at the same time throwing the telephone out of connection with the line; fourth, in a telephone electrical connection with the call, whereby, when two parties on different lines are in communication, all other instruments on those lines are cut out; fifth, in the automatic switch and a double electrical connection, whereby the telephone may be automatically put in circuit, whether the index be upon the unison-shunt or upon the bell-shunt.

That others may fully understand my invention, I will more particularly describe the same, having reference to the accompanying drawings, wherein—

Figure 1 is a perspective view of my call-box open. Fig. 2 is a side elevation of the telephone hook-lever. Fig. 3 is an elevation of the ratchet-wheel and pawls, showing the escapement-stop. Fig. 4 is a plan of the dial, showing the relative arrangement of the several station-shunts and intervals. Fig. 5 is a perspective of the escapement-stop. Fig. 6 is a diagram of the circuit-connections.

A is a vibrating polarized armature actuated by the electro-magnets B C, having different polarities. At the free or vibrating end of said armature two pawls, D E, are jointed to it; or they may be mounted at the extremities of an arm, F, projecting from and vibrating with said armature, if it is desirable to obtain a larger arc of vibration than the armature itself will secure. The pawls D E are fitted at their extremities to engage the teeth of the ratchet-wheel G, so that one of said pawls engages on the forward movement and pushes said ratchet, while the other of said pawls engages on the backward movement and pulls said ratchet. These pawls are mutually held in contact with the ratchet by a spring, H. These parts are the same in function and mode of operation in moving the index-switch K as those described in my patent above named; but I have made certain changes which will be here noted. The conductor-rim I of the dial is divided into as many imaginary equal divisions as there are stations provided for on the single line, and the station-bell shunt J is located within one of these imaginary stations; but said shunt is of less length than said station-space, and therefore each of said stations may be regarded as representing a shunt and a space and the several stations on one line as alternate shunts and intervening spaces.

In Fig. 4 the dotted lines on the dial represent the different positions of ten shunts, with the intervening spaces belonging to different stations supposed to be on the line to which the instrument belongs. Therefore to give a clear idea of the principles of operation it will be useful to describe the index as moving over alternate shunts and spaces, though, in fact, each station-dial has but one bell-shunt, and the several movements so described are distributed over the whole number of instruments in connection on one line. Hereinafter references to the stations on the dial are to be understood as meaning these station-distances.

The central-office instrument described in my application above named is provided with a dial, revolving index, and motor mechanism like that belonging to the invention described herein. The indexes of said central-office instrument and of the several local-station instruments are intended to move simultaneously and in unison. In my said patent it required one forward and one backward movement of the vibrating armature to move the index over the length of one station, and, supposing the initial position of the index to be on the dial-rim immediately behind a shunt, the first movement of the index would carry it to the middle of a shunt, and the next movement would carry it off the same to the dial-rim again.

In my application filed January 24, 1882, wherein the use of a magneto-generator is contemplated, it is necessary that the initial operative current shall be of full strength and duration; otherwise one or more of the indexes may fail to move, and the instrument be thus thrown out of unison at the first instant. A special commutator is therefore provided in that case to prevent that contingency. In the present invention, however, I propose to change the length of the station-shunt in relation to the length of the index movement, so that a greater number of pawl movements shall be required to move the index over the length of the station, and so arrange them that there shall not be less than four of said movements in the length of said station. These movements may be divided between shunt and intervals, so that not less than two pauses of said index shall occur on said shunt and not less than two pauses shall occur in the interval. An increased number of movements of the index within the space belonging to one station will not vary the effects proposed.

The automatic stop described in my application above mentioned is located in position corresponding with the second pause, and when the central-office index is arrested by said stop the local-station indexes are simultaneously arrested; but, supposing the index of the local station called has lost one movement, it must at the time of arrest have reached the point of first pause on its shunt, and therefore the bell of that station will be in circuit, whereby, as it will be perceived, even if the initial operative current shall be of less than full strength and duration, the indexes cannot be thrown completely out of unison from this cause, as the utmost divergence will be one movement, and the second will necessarily be a full current. I am thereby enabled to employ a magneto-generator without a commutator, and to close the circuit without regard to the position of its revolving armature or direction of the initial current. At the completion of a call all the indexes will always be brought again to unison against the detent L, so that at the next call they will again all start from the same point.

It has been observed that the momentum of the ratchet and index is sometimes sufficient to carry them forward after the movement of the pawls has ceased, and this movement may be sufficient to carry the index onto or off the station-shunt, as the case may be, and thereby defeat the call by causing the wrong bell to be rung or by failing to cause the right bell to be rung. At the central office there is no means whereby that accident might be foretold or averted. To obviate this I have applied to the ratchet G an escapement at a point corresponding with the station-shunt, so that that particular ratchet will be unable to move the index forward beyond its proper point of rest. This escapement consists of a pin, $i$, set in the ratchet G at the proper place, and a pair of arms or fingers, $h\ k$, attached to or operated by the vibrating armature. At the completion of the movement of the arm F next preceding the engagement of the index with the station-shunt the arm $h$ rests in front of said pin, and the ratchet cannot move forward to cause engagement of the index with the shunt until said arm is withdrawn by the succeding movement of the armature and arm F. At the completion of succeeding movement thereafter—viz., before the index moves off said shunt—the arm $k$ rests in front of said pin, and the ratchet is thereby prevented from moving the index off its station-shunt. Thus it will be seen that momentum cannot cause either engagement with or disengagement from the station-shunt.

If two parties desiring to speak are on the same line, it is necessary at the completion of the call to bring all the indexes to the unison-shunt M, so that the instruments to be used shall both be in circuit. This of course puts all other instruments on that line in circuit, and the subscribers on that line have it in their power to interrupt. To prevent an unintentional interruption, I provide an additional shunt, which is connected with the telephone-circuit, to which the indexes may be moved while the line is in use. This shunt may be located anywhere on the dial; but it is more convenient to locate it adjoining the unison-shunt, and I prefer not only to locate it adjacent to said shunt, but to make it an extension of the same, as at S, and to connect it with the telephone-circuit by way of the detent-magnets I, and thereby avoid a separate connection. Each subscriber has visual notice by the abnormal position of this index that the line is in use.

The arrangement of instruments described in my patent above mentioned left it possible, when two persons on different lines were talking for others, to hear or interrupt the passing conversation. In order to prevent this and secure the same privacy of communication to those on combination-lines that is enjoyed by subscribers having individual connection with the central office, I have resorted to the following device:

The telephone used in connection with each local call-instrument is provided with a double connection, whereby it may be in circuit when the index is on the unison or indicator shunt or on the local station bell-shunt, but cannot be in circuit when the index rests on the dial-rim. Therefore when two telephones on different lines are in use, the indexes of the call-instruments resting on their respective bell-shunts, all other telephones and generators on those lines are out of circuit and conversation passes with entire secrecy. The double connection is described as follows: The current flowing in one direction comes in on the line-wire $m$ through the motor-magnets B C to the index K. If the index is then resting on the rim I, the current then passes to the line $o$ by wires $p$ $q$, the bell and telephone being cut out. If the index is resting on the unison-shunt M, the current passes by wire $r$ through the detent-magnets T and back to the hook-lever $f''$. Thence, if said hook is depressed by the weight of the telephone, it passes by way of the switch-spring $k'$ and wire $t$ to the generator-frame and to the line $o$.

It has before been pointed out that communication between subscribers on the same line will take place only when the indexes are on the unison-shunt. Hence after the call the telephone will be taken off the hook-lever $f'$, and the same will break contact with the spring $k'$ and make contact with the spring $s'$, whereby the current will pass from the unison-shunt to the telephone W and by wire $q$ to line $o$; but when the index moves forward to a station-shunt, J, the current then goes from said shunt by wire $u$ to the spring $g'$, (which while the hook-lever $f'$ is depressed is in contact with the switch-spring $h'$,) and thence by wire $v$ to the bell and to the line $o$. When the telephone is taken off the hook the lever $f'$ rises and pushes the spring $g'$ upward in contact with the switch-spring $i'$, and the current then goes to the telephone W, and thence by wire $q$ to the line. Therefore the double connection above described enables the telephone to be automatically put in circuit by taking it off the hook, whether the index-switch is on the unison or station-bell shunt. If the currents are to and fro, it will be understood that the currents will pass these connections in opposite direction alternately; but in every case they will pass by the wires indicated.

Having described my invention, what I claim as new is—

1. The index-switch of a telephone local call, with its operative motor-magnets, vibrating polarized armature, push-and-pull pawls, and ratchet-wheel, combined with an escapement actuated by said armature, whereby the ratchet is arrested prior to the engagement of the index with and disengagement from the station-shunt, for the purpose set forth.

2. The index-switch K, with its motor-magnets, and the vibrating armature A and push-and-pull pawls D E, combined with the index-ratchet G, provided with the pin $i$, and the escapement-arms $h$ $k$, projecting from said armature, as set forth.

3. In a telephone local call, a revolving index-switch and dial-rim in the line-circuit, combined with a unison-shunt twice as long as the local-station shunt, or thereabout, whereby the index may be moved forward out of normal position of rest without going off the unison-shunt, for the purpose set forth.

4. In a telephone local call, a revolving index in the line-circuit with a local station or bell-shunt, combined with a telephone in the bell branch circuit and an automatic switch, whereby the current will be sent direct to the bell and line when the receiver is hanging on its hook or through the receiver to the line when said receiver has been taken off its hook, as set forth.

5. In a telephone local call, a revolving index-switch in the line-circuit, a local station or bell-shunt, and a contact-spring, $g'$, in connection with said local shunt, combined with a pivoted hook-lever, $f'$, whereon the telephone may hang, as usual, and switch-springs $i'\ k'$, one or the other whereof is in contact with said spring $g'$ as said lever is up or down, and the current correspondingly shunted to the bell or to the telephone, as set forth.

6. In a telephone local call, a revolving index-switch in the line-circuit or unison-shunt and a station-bell shunt separated therefrom, combined with contact-springs $g'$ and $s'$, switch-springs $i'$, and a pivoted hook-lever, $f'$, whereby the current may be automatically sent to the telephone from either the unison-shunt or station-shunt by the act of removing it from the hook.

7. In a telephone local call, a dial-rim and a revolving index in the line-circuit, combined with a local bell-shunt on said dial, the length whereof is such that the index, in passing, must make at least two pauses upon said shunt.

JAMES P. STABLER.

Witnesses:
R. D. O. SMITH,
J. C. TURNER.